United States Patent [19]

Shioda et al.

[11] Patent Number: 5,582,729
[45] Date of Patent: Dec. 10, 1996

[54] FUEL TANK EQUIPMENT FOR VEHICLE

[75] Inventors: Mitsugu Shioda, Hiroshima; Tsutomu Oshida, Osaka-fu, both of Japan

[73] Assignee: Nifco Inc., Yokohama, Japan

[21] Appl. No.: 111,433

[22] Filed: Aug. 25, 1993

Related U.S. Application Data

[63] Continuation of Ser. No. 836,596, Feb. 18, 1992, abandoned.

[30] Foreign Application Priority Data

Feb. 18, 1991 [JP] Japan ................................. 3-045751

[51] Int. Cl.⁶ ........................................... B01D 35/02
[52] U.S. Cl. .......................... 210/461; 210/486; 210/172; 210/416.4
[58] Field of Search ................... 210/172, 416.4, 210/459–463, 486

[56] References Cited

U.S. PATENT DOCUMENTS

| | | | |
|---|---|---|---|
| 3,206,036 | 9/1965 | Hawley | 210/460 |
| 3,875,059 | 4/1975 | Maschino . | |
| 4,129,503 | 12/1978 | Joseph | 210/460 |
| 4,304,664 | 12/1981 | McAlindon et al. | 210/460 |
| 4,312,753 | 1/1982 | Bell | 210/416.4 |
| 4,684,463 | 8/1987 | Mizusawa . | |
| 4,783,260 | 11/1988 | Kurihara | 210/416.4 |
| 4,874,510 | 10/1989 | Akira et al. | 210/460 |
| 4,966,522 | 10/1990 | Koama | 210/460 |
| 5,016,670 | 5/1991 | Sasaki et al. . | |
| 5,044,526 | 9/1991 | Sasaki et al. . | |
| 5,049,271 | 9/1991 | Cain | 210/460 |
| 5,084,166 | 1/1992 | Shiraga et al. | 210/172 |
| 5,120,434 | 6/1992 | Yoshida | 210/460 |

*Primary Examiner*—Matthew O. Savage
*Attorney, Agent, or Firm*—Oblon, Spivak, McClelland, Maier & Neustadt, P.C.

[57] ABSTRACT

A fuel tank filter assembly for a vehicle is disclosed which includes a suction pipe and a filter connected through the pipe to an inlet port of a bottom plate for a fuel suction pump, and which is characterized in that the bottom plate is formed of resin material so as to be integral with the suction pipe. Also disclosed is a shape retaining frame of a box-like shape made of a resin and having downwardly extending protrusions. The frame includes a plurality of beams and the filter assembly includes a filter fabric formed into a bag which encapsulates the frame, a stopper member for engaging the protrusions upon downward deflection of the protrusions, and a suction pipe made of a resin, one end of the suction pipe being inserted into an insertion opening of the filter fabric and attached to the frame, the other end of the suction pipe being connected to an inlet port of a fuel suction pump outside the filter fabric, and which is characterized in that the peripheral portion of the insertion opening of the filter fabric for insertion of the suction pipe is interposed between an upper flange formed in the frame and has an opening for insertion of one end of the suction pipe and a flange formed on the suction piper correspondingly to the upper flange, and by the frame and the suction pipe being fusion-bonded together.

2 Claims, 5 Drawing Sheets

FUEL TANK EQUIPMENT FOR VEHICLE

This application is a Continuation of application Ser. No. 07/836,596, filed on Feb. 18, 1992, now abandoned.

BACKGROUND OF THE INVENTION

1. Field of the Invention

The present invention relates to fuel tank equipment for a vehicle which comprises a filter that is attached to the front end of a fuel suction pump to filter off impurities contained in a liquid fuel.

2. Discussion of the Background

A fuel tank which is mounted in a vehicle is charged with liquid fuel to be sucked from the tank and supplied to an engine by means of a fuel suction pump. The liquid fuel charged in a fuel tank is likely to contain impurities such as dust. Accordingly, it is necessary to take some measures to remove such impurities from fuel to be supplied to an engine.

FIG. 6 shows one example of a centrifugal force-proof vessel in a conventional fuel tank for a vehicle.

When an automobile takes a turn, fuel contained in a fuel tank 51 is biased by the action of centrifugal force, and consequently, suctional action of a suction pump on the fuel is likely to undergo an adverse effect. To avoid this, the centrifugal force-proof vessel 50 is provided as a subsidiary tank so that the fuel is reliably sucked even under centrifugal force.

The centrifugal force-proof vessel 50 comprises a centrifugal force-proof vessel body 52, a pump bracket 53, a fuel suction pump 54 disposed in the pump bracket 53, a filter 56 attached to an inlet port of a bottom plate (not shown) of the pump 54, and return pipe 57.

The fuel which has been caused to flow from the fuel tank 51 into the centrifugal force-proof vessel body 52 is sucked through the filter 56 by means of the fuel suction pump 54, and then supplied to an engine (not shown). Through engine operation, the remaining fuel is allowed to return through the return pipe 57 to the centrifugal force-proof vessel body 52.

The filter 56 comprises a shape retaining frame 59 made of a resin and having a box-like skeleton comprised of beams 58, a filter fabric 60 formed as a closed bag encapsulating the frame 59, and a suction pipe 61 one end of which is inserted into the filter 59 and attached to an upper wall 59a of the frame and the other end of which is connected to the inlet port of the pump 54 outside the filter fabric 60.

In the filter 56 of the conventional fuel tank for a vehicle, however, when the suction pipe 61 is attached to the pump 54, the other end of the suction pipe 61 is press-fitted into the fuel inlet port formed in the bottom plate of the pump 54, and then sealing is effected, followed by fastening by means of a push nut to prevent the other end of the suction pipe 61 from coming off. Consequently, there are problems in that many parts and manufacturing steps lead to an increased cost, and that satisfactory sealing properties at the fit portion can not be attained so that suction efficiency of the pump 54 is impaired.

Further, in the filter 56, the suction pipe 61 is unified with the filter fabric 60 during its molding in such a manner that the suction pipe 61 is inserted into the insertion opening 62 of the filter fabric 60 and yet the peripheral portion 60a of an insertion opening 62 is inserted into a flange 61a, to unify the suction pipe 61 with filter fabric 60. On this account, it is necessary for molding the suction pipe 61 to place the filter fabric 60 into a mold, leading to poor manageability and productivity. Further, such a mold has an enlarged size and tends to be complicated, leading to a high production cost.

Moreover, in the filter 56, no structural measure is taken to avoid abutment of the suction opening 61A of the suction pipe 61 upon the filter fabric 60 which occurs when the the upper wall 59a of the 59 is forced to move downwardly together with the suction pipe 61 due to deflection of the frame 59 caused by jolt of a vehicle or the like, as shown by the phantom line. Accordingly, when the opening 61A abuts upon the filter fabric 60, suction of a fuel is retarded, thereby impairing suction efficiency of the pump 54.

SUMMARY OF THE INVENTION

It is an object of the present invention to provide a fuel tank equipment for a vehicle which has improved fuel suction efficiency.

It is another object of the present invention to provide such a fuel tank equipment with a simplified structure at low cost.

To accomplish the above-mentioned objects, there is provided according to the present invention a fuel tank equipment comprising:

a suction pipe, and a filter connected through the pipe to an inlet port of a bottom plate for a fuel suction pump, characterized in that the bottom plate is formed of resin material so as to be integral with the suction pipe.

There is also provided a fuel tank equipment for a vehicle which comprises a filter comprising:

a shape retaining frame of box-like shape made of a resin and comprised of a plurality of beams, a filter fabric formed into a bag which encapsulates the frame, and a suction pipe made of a resin, one end of the suction pipe being inserted into an insertion opening of the filter fabric and attached to the frame, the other end of the suction pipe being connected to an inlet port of a fuel suction pump outside the filter fabric.

characterized in that the peripheral portion of the insertion opening of the filter fabric for insertion of the suction pipe is interposed between an upper flange formed in the frame and having an opening for insertion of one end of the suction pipe and a flange formed on the suction pipe correspondingly to the upper flange, and then the frame and the suction pipe are fusion-bonded together.

There is further provided a fuel tank equipment for a vehicle which comprises a filter comprising:

a shape retaining frame of box-like shape made of a resin and comprised of a plurality of beams, a filter fabric formed into a bag which encapsulates the frame, and a suction pipe made of a resin, one end of the suction pipe being inserted into an insertion opening of the filter fabric and attached to the frame, the other end of the suction pipe being connected to an inlet port of a fuel suction pump outside the filter fabric, characterized in that abutment preventive protrusions are provided around the opening of one end of the suction pipe to maintain a gap between the opening and the bottom portion of the filter fabric.

It is preferred that the abutment preventive protrusions are provided on the under surface of the upper flange of the frame, and a stopper step be formed in each lower cross beam of the frame to confine downward movement of the protrusions.

According to the present invention, since the bottom plate is unified with the suction pipe, the sealing properties therebetween are improved, and as a result, suction efficiency is increased.

Further, the suction pipe unified with the bottom plate can be attached to the pump body using no additional joint member, so that production cost is reduced and inexpensive fuel tank equipment can be provided.

Moreover, the peripheral portion of the insertion opening of the filter fabric is held between the flange of the frame and the flange of the suction pipe, and then the frame and the suction pipe is fusion-bonded. Consequently, it is possible to unify the filter fabric, the suction pipe and the frame, after the suction pipe is molded. Accordingly, the production process is simplified and inexpensive fuel tank equipment is provided by virtue of reduced production cost.

Furthermore, by the presence of the protrusions arranged around the one end opening of the suction pipe, abutment of the opening upon the filter fabric at the bottom of the filter can be prevented, thereby enabling stabilized suction efficiency of the pump to be realized.

The above and other object and advantages of the present invention will be readily understood from the following description with reference to the accompanying drawings.

DESCRIPTION OF THE PREFERRED EMBODIMENT

Figure 1:
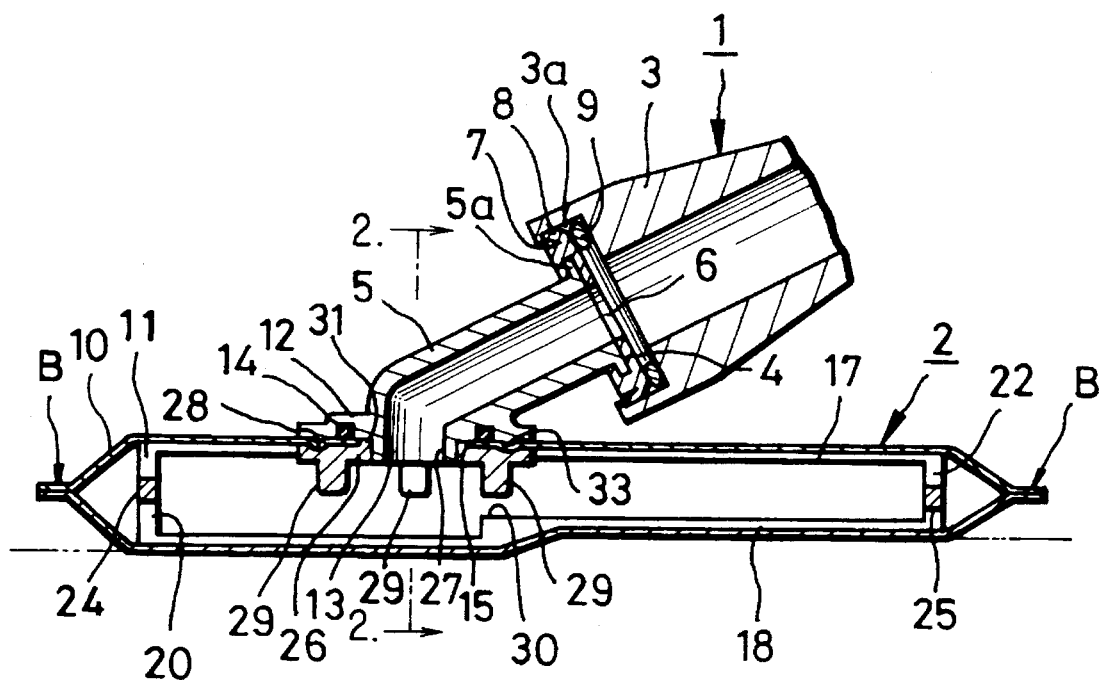
FIG. 1 is a cross-sectional view showing a substantial portion of the fuel tank equipment for a vehicle according to the present invention.

Now, an embodiment of the present invention will be described in detail with reference to the drawings. However, it should be understood that the present invention is by no means restricted to this embodiment.

FIGS. 1 to 5 each show the structure of a substantial portion of a fuel tank equipment for a vehicle according to the present invention.

In these FIGS., with respect to the fuel tank equipment for a vehicle, a filter 2 is connected to a fuel suction pump 1.

The fuel suction pump 1 is provided with a ring-shaped bottom plate 4 attached to the bottom end of a pump body 3.

The bottom plate 4 is made of a resin material. In molding of the bottom plate 4, a flange 5a at the rear end of a suction pipe 5 made of a resin is inserted in a starting resin material for the bottom plate 4, and then insert-molding is effected to obtain the bottom plate 4 integrated with the suction pipe 5. Thus, an inlet port 6 of the bottom plate is in communication with the suction pipe 5. In addition, an elastic lip 8 having a V-shaped groove 7 is provided over the whole peripheral surface of the bottom plate 4.

In attaching the bottom plate 4 to the pump body 3, for the purpose of sealing, a ring-shaped rubber gasket 9 is first placed in the concave portion 3a of the pump body 3, and then the elastic lip 8 is snap-in fitted into the concave portion 3a to interpose the gasket 9 therebetween.

Consequently, under such a condition that the bottom plate is fitted in the bottom concave portion 3a, the elastic lip 8 is pressed against the inner surface of the bottom concave portion 3a, thereby enabling an increased sealing effect to be attained.

The filter 2 comprises the suction pipe 5, the filter fabric 10 and the frame 11.

The suction pipe 5 has a flange 12 near the front end of its peripheral surface, which extends outwardly from the peripheral surface. In the under surface of the flange 12, an annular groove 14 and an annular protuberance 33 are concentrically formed with the opening 13.

The filter fabric 10 is, for example, a sheet of twill fabric with fine meshes prepared by twilling a polyethylene type thread. The sheet is folded in two and the lapped periphery is fusion-bonded to form a closed bag at the final stage of manufacturing a filter 2. Before the sheet is formed into a bag, an insertion opening 15 through which the front end of the suction pipe 5 is to be inserted is formed in the sheet. The insertion opening 15 has an inner diameter substantially equal to the outer diameter of the front end of the suction pipe 5.

Figure 4:
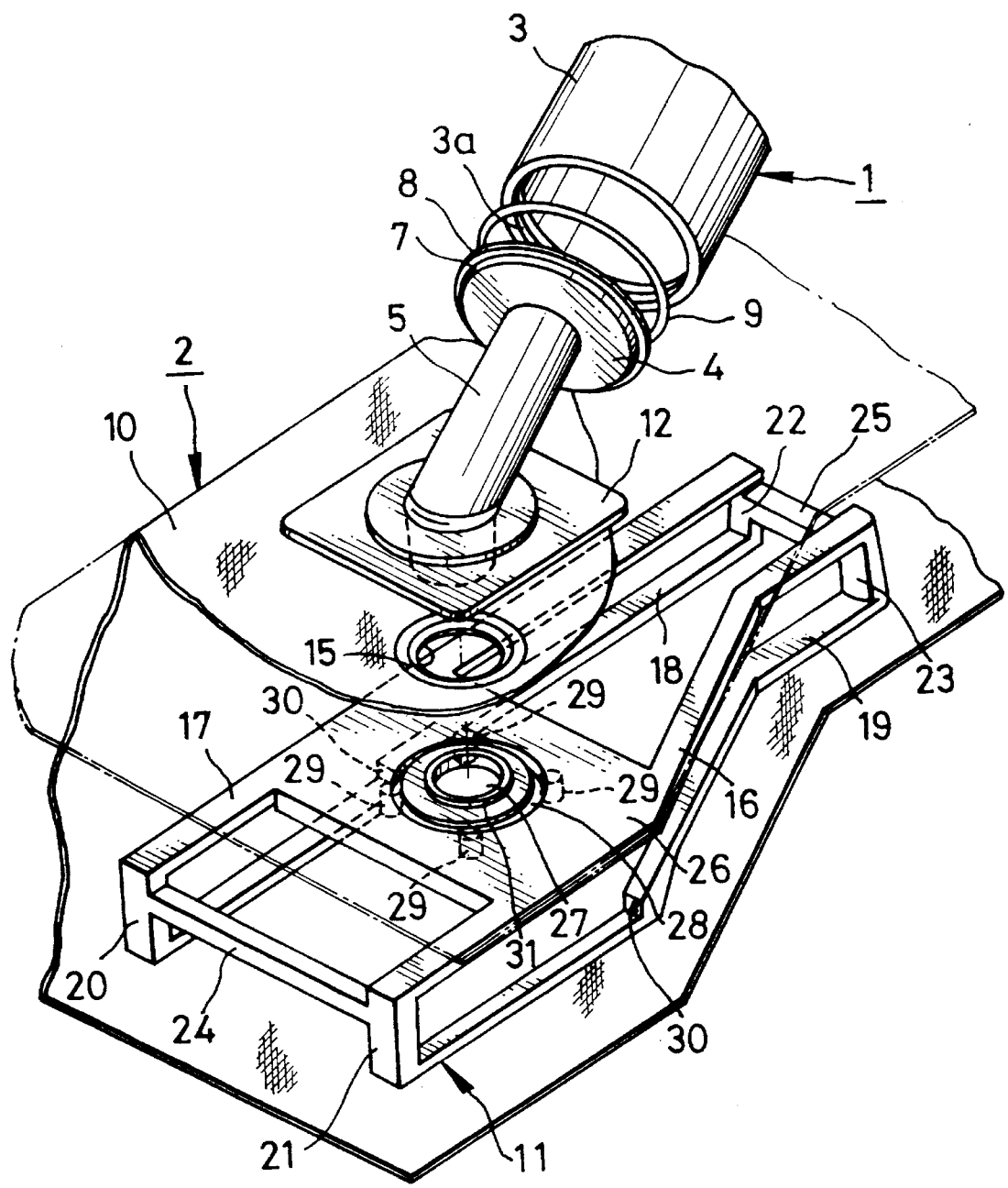
FIG. 4 is a exploded perspective view showing the fuel tank equipment.

The frame 11 is made of a resin material and the starting resin material is integrally formed into a box-like skeleton frame, as generally shown in FIG. 4, which comprises upper cross beams 16 and 17, lower cross beams 19 and 18 located below and opposite the upper cross beams 16 and 17, respectively, four posts 20, 21, 22 and 23 providing a space between the upper cross beams 16, 17 and the lower cross beams 19, 18, an intermediate cross beam 24 connecting the post 20 to the post 21 at their middle positions, an intermediate cross beam 25 connection the post 22 to the post 23 at their middle positions, and a flange 26 spanning the upper cross beam 16 and the upper cross beam 17 at their substantially middle positions.

At the center portion of the flange 26, a hole 27 formed perpendicularly therethrough which has an inner diameter substantially equal to the outer diameter of the front end of the suction pipe 5, and which is defined by the tubular portion 31. In the upper surface of the flange 26, a shallow groove 28 is formed concentrically with the hole 27 and correspondingly to the protuberance 33 of the flange 12 of the pipe. On the other hand, the under surface of the flange 26 has four abutment preventive protrusions 29 protruding downwardly therefrom and arranged on a virtual circle imaged concentrically with the hole 27. A step 30 is formed in each of the lower cross beams 18 and 19 so that a difference in thickness of each of the lower cross beams is provided, preferably, at a substantially middle position thereof.

Figure 5:
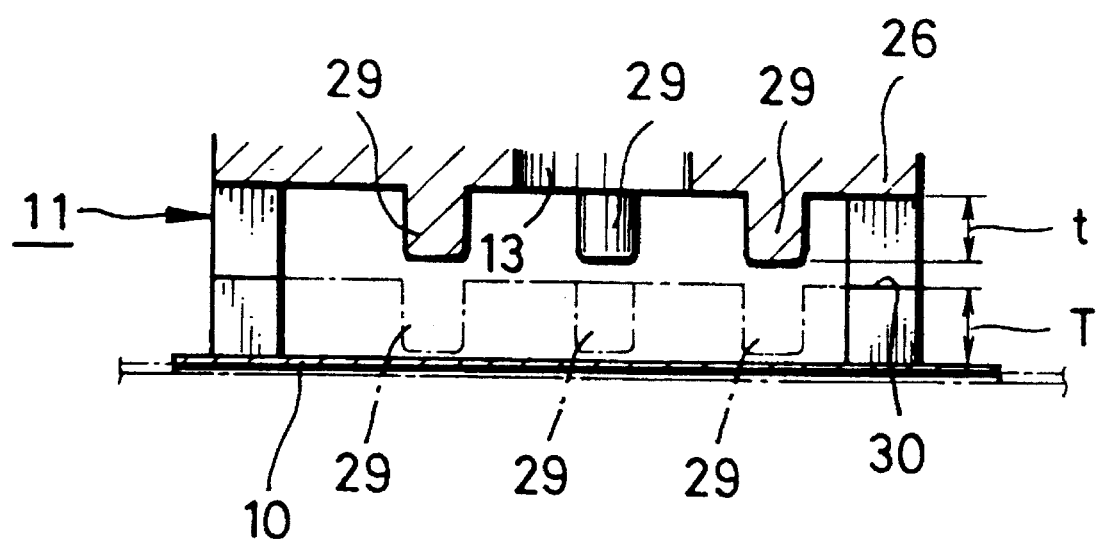
FIG. 5 is a partially sectional view of the fuel tank equipment shown in FIGS. 1 to 4.
Figure 6:
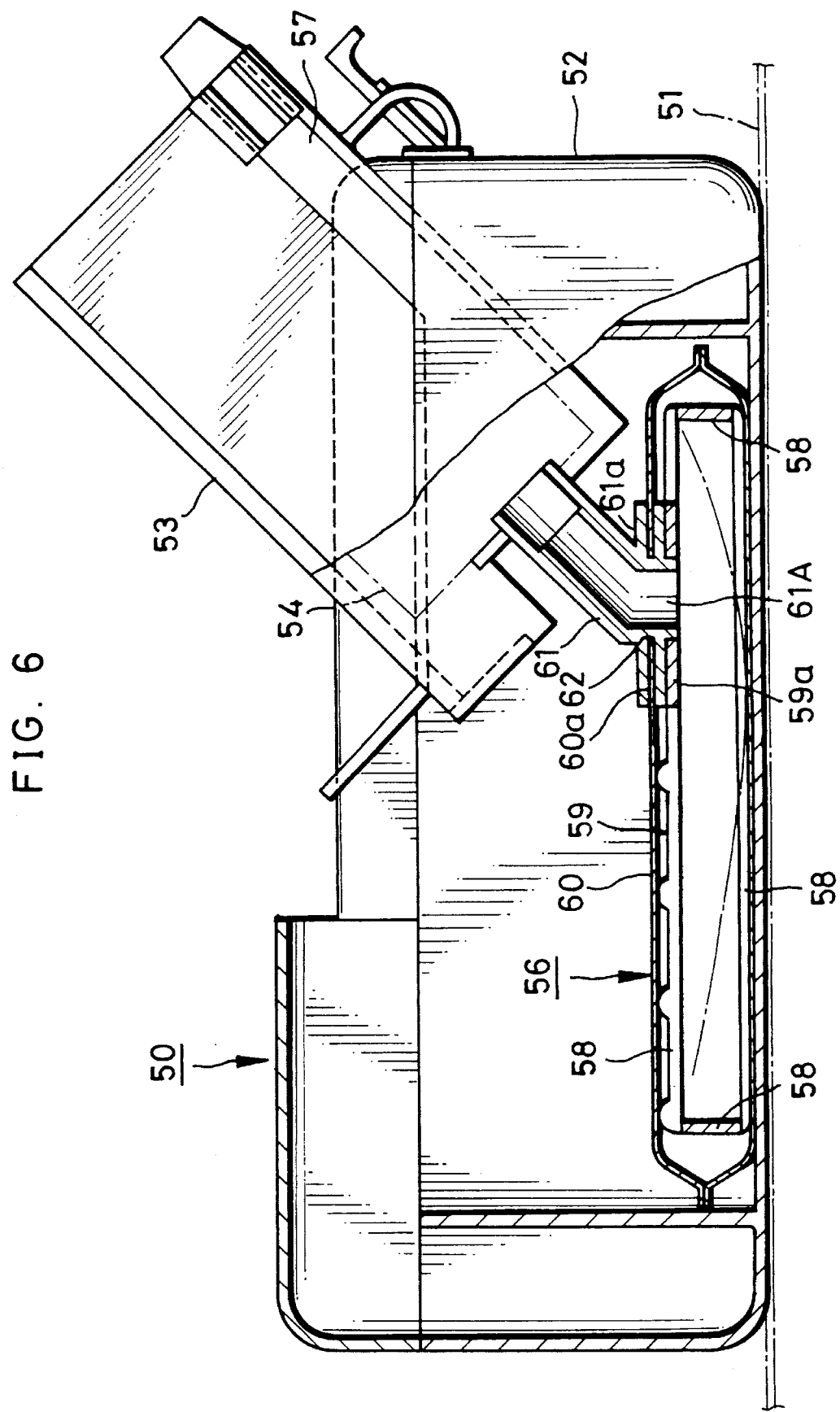
FIG. 6 is a cross-sectional view schematically showing a structure of a centrifugal force-proof vessel in a conventional fuel tank for a vehicle.

The step 30 has a thickness T substantially equal to or slightly larger than the depth t of the protrusions (see, FIG. 5).

With respect to manufacturing of the filter 2 so structurally featured, description will be given as follows. The filter 2 is manufactured before the suction pipe 5 is attached to the pump body 3.

First, the filter fabric 10 in the form of a sheet is placed on the flange 26 of the flame 11 in such a manner that the insertion opening 15 conforms with the tubular portion 31.

Thereafter, a rubber gasket 12 is fitted in the groove 14 of the flange 15, the front end of the suction pipe 5 is then inserted into the hole 27 to hold the peripheral portion of the insertion opening 15 between the flange 12 of the suction pipe 5 and the flange 26 of the frame 11.

Figure 2:
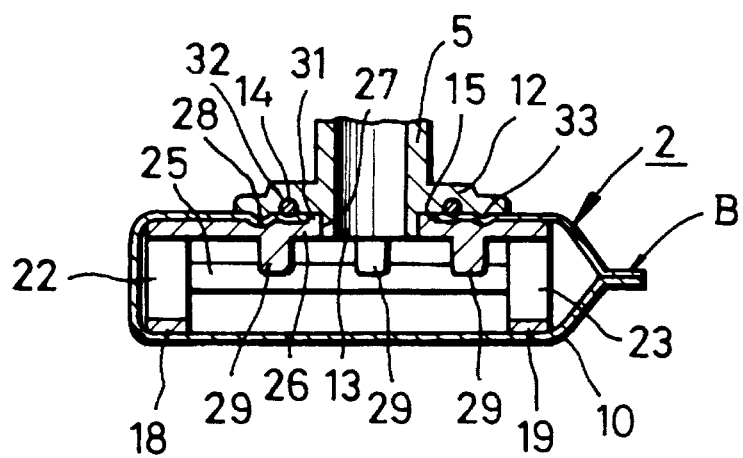
FIG. 2 is a cross-sectional view taken along line 2—2 in FIG. 1.
Figure 3:
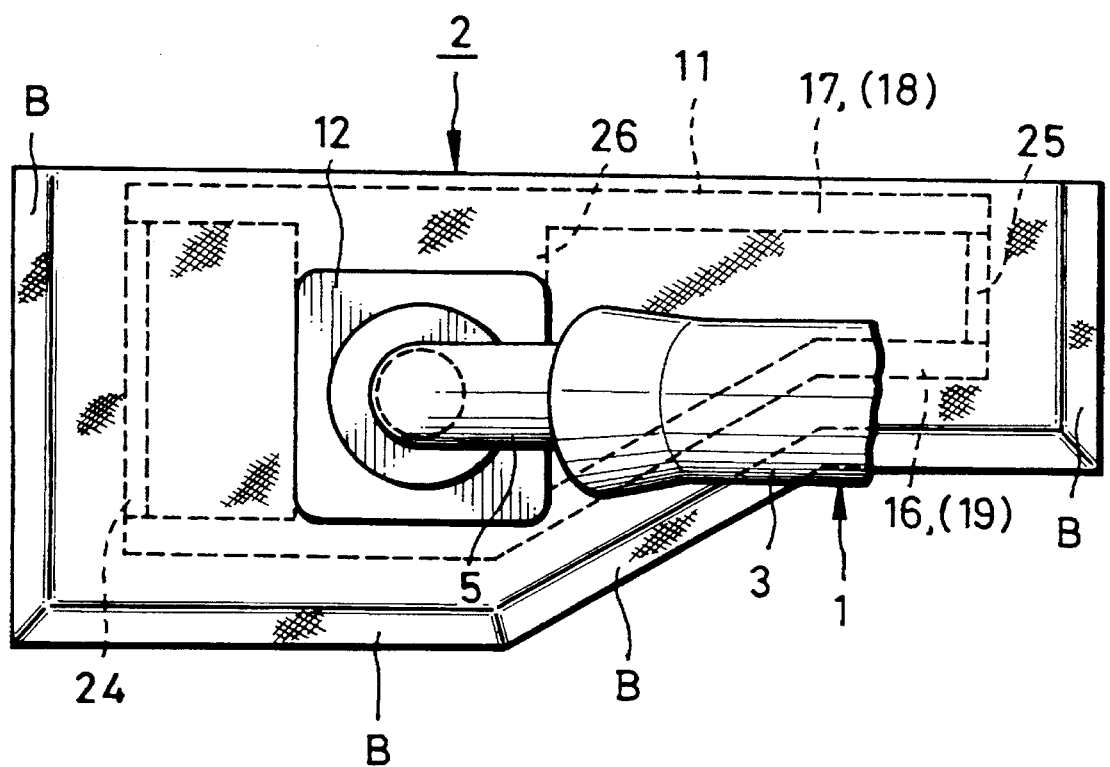
FIG. 3 is a top plan view showing the fuel tank equipment for a vehicle.

In this embodiment, as shown in FIG. 2, the protuberance 33 on the flange 12 causes to the filter fabric 10 to be pressed against the groove 28 in the flange 26, and as a result, the peripheral portion of the filter fabric 10 is firmly held between the flanges 12 and 26.

Then, under this condition, the peripheral surface of the front end portion of the suction pipe 5 is ultrasonic-bonded with the inner surface of the hole 27 of the flange 26 to unify the suction pipe 5, the frame 11 and the filter fabric 10.

Then, the filter fabric 10, which is still in the form of a sheet, is folded in two while wrapping the flame 11 therein, and the lapped periphery B of the filter fabric 10 is fusion-bonded to form a closed bag encapsulating the frame 11. The filter 2 is now completed.

The thus prepared filter 2 is attached to the pump body 3 of the fuel suction pump 1 through the bottom plate 4, as described above, and incorporated into a fuel tank (not shown) along with the fuel suction pump 1.

In the filter 2, the protrusions 29 are arranged on the under surface of the flange 26 around the suction opening 13 of the suction pipe 5. Accordingly, even if the frame 11 is downwardly deflected due to, for example, shocks applied to the vehicle so as to cause a descent of the flange 26 together with the suction pipe 5 to take place, a gap between the filter fabric 10 at the bottom of the filter 2 and the opening 13 is ensured by the presence of the protrusions 29 to prevent the opening 13 from abutting on the filter fabric 10, thereby surely maintaining fuel suction efficiency at a stable satisfactory level.

Further, the step 30 is formed in each of lower cross beams 18 and 19 to confine downward movement of the protrusions 29, and hence the protrusions 29 are prevented from tapping the filter fabric 10, thereby causing no damage on the filter fabric 10.

Hereinbefore, the present invention has been described with reference to the preferred embodiment. However, the present invention is not restricted to the embodiment. Accordingly, for example, the filter 2 and the fuel suction pump 1 may be mounted in a fuel tank directly or via a centrifugal force-proof vessel. Further, the protrusions 29, which ensure a gap between the filter fabric 10 and the opening 13, do not necessarily have to be in the shape of a pin.

What is claimed is:

1. A fuel tank filter assembly for a vehicle, which comprises:

a shape retaining frame made of a resin, said frame including a first pair of beams and a second pair of beams located opposite the first pair of beams, a first flange spanning said first pair of beams and a step member forming part of each of said second pair of beams, a filter fabric formed into a bag which includes an insertion opening and which encapsulates said frame, a fuel suction pump located outside said bag and which includes an inlet port;

a suction pipe made of a resin and having a first end defining an opening and a second flange spaced from said first end, the first end of said suction pipe being inserted into said insertion opening of said filter fabric and attached to said first flange, a second end of said suction pipe being connected to said inlet port of said fuel suction pump, wherein a peripheral portion of said insertion opening of said filter fabric for insertion of the suction pipe is interposed between said second flange and said first flange, wherein said first flange includes a protrusion located in proximity with said first end of said suction pipe, said protrusion extending towards a portion of the fabric located between said second pair of beams to ensure a gap between the opening defined by the first end of the suction pipe and said portion of the fabric, and wherein said step member prevents said protrusion from tapping said portion of the filter fabric by confining movement of said protrusion towards said portion of said filter fabric by contacting said first flange when said vehicle undergoes shocks during travel which deflects the first pair of beams of said frame towards said second pair of beams.

2. A fuel tank filter assembly for a vehicle, which comprises:

a shape retaining frame made of a resin, said frame including a first portion and a second portion which are spaced apart, a flange located on said first portion, and a step member located on said second portion, a filter fabric formed into a bag which encapsulates said frame, said filter fabric having an opening formed therein, a fuel suction pump located outside said filter fabric and having an inlet port, and a suction pipe made of a resin, a first end of said suction pipe defining an opening and being inserted into said opening of said filter fabric and attached to said flange, a second end of said suction pipe being connected to said inlet port of said fuel suction pump, wherein a protrusion is provided on said flange to ensure the existence of a gap between the opening of the first end of the suction pipe and a portion of the filter fabric spaced from and positioned opposite the opening of the suction pipe, wherein said step member has a thickness not less than a depth dimension of the protrusion and is positioned on said second portion of the frame opposite said flange and normally spaced from said flange to prevent tapping of said portion of the filter fabric by the protrusion by limiting the deflection of the protrusion toward said portion of the filter fabric by contacting said flange when the vehicle experiences shocks during travel of the frame.

\* \* \* \* \*